United States Patent [19]

Seufert

[11] 4,304,230

[45] Dec. 8, 1981

[54] LIQUID BARRIER FILTER AND METHOD OF OPERATION

[75] Inventor: Wolf D. Seufert, Sherbrooke, Canada

[73] Assignee: Universite de Sherbrooke, Quebec, Canada

[21] Appl. No.: 92,733

[22] Filed: Nov. 9, 1979

[51] Int. Cl.³ .................... A62B 7/10; B01D 47/00
[52] U.S. Cl. ......................... 128/206.17; 55/234; 55/243; 55/DIG. 35; 128/206.12
[58] Field of Search .............. 55/90, 91, 96, 233, 55/234, 242, 243, DIG. 35; 128/205.29, 206.17

[56] References Cited

U.S. PATENT DOCUMENTS

| | | | |
|---|---|---|---|
| 1,690,813 | 11/1928 | Birkholz | 55/223 |
| 1,976,401 | 10/1934 | Ilg | 128/205.29 |
| 3,113,007 | 12/1963 | Cicero et al. | 55/84 |
| 3,116,972 | 1/1964 | Bevevino et al. | 55/91 |
| 3,328,941 | 7/1967 | Green | 55/234 |
| 3,710,548 | 1/1973 | Coughlin | 55/73 |
| 3,762,133 | 10/1973 | Merriman et al. | 55/73 |
| 3,873,281 | 3/1975 | Himes et al. | 55/96 |
| 3,980,080 | 9/1976 | Muto | 55/DIG. 35 |
| 3,986,851 | 10/1976 | Groder | 55/488 |
| 4,049,398 | 9/1977 | Vaseen | 55/3 |

FOREIGN PATENT DOCUMENTS

| | | | |
|---|---|---|---|
| 952441 | 8/1974 | Canada | 55/91 |
| 820697 | 9/1959 | United Kingdom | 55/90 |
| 363273 | 10/1973 | U.S.S.R. | 55/96 |

*Primary Examiner*—David L. Lacey
*Attorney, Agent, or Firm*—Cushman, Darby & Cushman

[57] ABSTRACT

There is provided a process for removing pollutant particulates from a contaminated gas which comprises:
(a) passing a stream of gas containing pollutant particulates through a liquid film absorbed on a continuously circulating filter supported by a perforated carrier matrix wherein part of said filter is continuously passing through a liquid reservoir containing said filtering liquid selected from liquid fluorocarbons and liquid silicones whereby the contaminant particulates carried by said gas are absorbed by said liquid film acting as a filter barrier for said particulates, and
(b) recovering the gas after its passage through said liquid film barrier filter, said gas being free of said particulates. There is also disclosed an apparatus for carrying out the process. The apparatus can be positioned in a face mask.

6 Claims, 4 Drawing Figures

LIQUID BARRIER FILTER AND METHOD OF OPERATION

BACKGROUND OF THE INVENTION

Generally speaking, there are three types of conventional filtration systems for cleaning a gas of particulate matter suspended therein. One system comprises a porous matrix placed into the gas stream to intercept, collect and retain pollutant particles which cannot follow the gas through the matrix since their inertia prevents them from changing directions abruptly. Another system involves electrostatic precipitation where intrinsic or induced charges on the pollutant particles are used to collect and hold same on a system of surfaces of the appropriate polarity. Finally, a system known as 'scrubbing' involves the discharge of finely dispersed water or liquid chemicals into the polluted gas so as to provide a large surface of contact for the absorption of the pollutants and literally wash them out of the gas phase. All these methods have their specific field of application and are selected according to the specific size distribution of the solid pollutant.

It is appreciated that a filter having a 100% efficiency for prolonged periods is highly desirable in certain situations, but is very difficult, if not impossible, to achieve with presently available filtration techniques. The most stringent requirements concerning the number of pollutant particles have to be met for what is called 'clean rooms' in the pharmaceutical and electronics industries. Ultra-high-efficiency filters performing to such standards are those which can remove more than 99.9% of airborne particles with a diameter of 1 to 5 microns but they are expensive since initial and operating costs increase much faster than the efficiency of the filter system. The position taken by environmentalists is that the present standards of air sanitation were established to accomodate the available filtration technology rather than according to the desired level of airborne pollutants. For example, though the highly radiotoxic element plutonium should not be tolerated in the atmosphere, there is no presently available filtering system known to guarantee the elimination in the respired air.

Conventional filters can be guaranteed to provide peak performance during prolonged periods only for rigorous conditions as to particle size distribution, pressure load on the filter and particle influx density. Even when these conditions are optimized, prolonged exposure of porous matrix filter as it is charged will steadily reduce its efficiency, especially for particles of an intermediate size on the filter's performance curve by increasing its flow resistance and decreasing its absorptive power. Evidently, precipitators and scrubbers are not as easily overloaded, but they are also less efficient than matrix filters in the removal of particulate matter from an atmosphere.

Accordingly, it is an object of the present invention to provide a filtering system for removing all of the particulate pollutants from an atmosphere or a gas thereby to provide a particulate-free atmosphere or gas.

SUMMARY OF THE INVENTION

In its broadest form, the present invention provides a process for removing pollutant particulates from a contaminated gas containing same by passing a particulate polluted stream of gas through a continuous liquid film of a liquid fluorocarbon or silicone supported by a moving carrier filter matrix whereby the particulates which are not retained by the solid filter are diverted to and absorbed by the liquid film acting as a filter or barrier at the interstices of the solid filter.

More specifically, it has now been found that a continuous liquid film of a liquid fluorocarbon or liquid silicone is surprisingly suitable to inactivate the momentum of pollutant particulates passing therethrough and to absorb said particulates while permitting the gas stream to pass through said liquid film devoid or free of said particulates. In other words, in accordance with the present invention, it has now been found that a continuous liquid film of liquid fluorocarbon or liquid silicone is surprisingly adapted to act as a filter barrier to absorb pollutant particulates dispersed in a gas while allowing the gas to flow through the liquid filter free of particulates and recovering the pollutant particulates in the reservoir. The gas itself is first dissolved upon contact with the continuous liquid barrier and because of its kinetic energy and difference of pressure on the opposite side of the liquid barrier filter the gas is extracted while particulates are retained by the liquid barrier filter because they do not possess sufficient kinetic energy to pass through the continuous liquid filter made up of liquid fluorocarbons or silicones.

One advantage of the system of the present invention is that the slow rotation of the filter matrix through a liquid reservoir not only replenishes the liquid but also washes off particulates that have accumulated on the filter thus providing a system that continuously renews itself while preventing clogging and increased flow resistance. This constitutes a true advantage over conventional filters that have to be exchanged and cleaned and which sometimes require treatment to assure that particles stick to the matrix after initial contact.

The absorbent liquid which can be used as a liquid filter barrier in accordance with the present invention comprises alkane and cycloalkane derivatives having at least one fluorine atom, perfluoroamines including heterocyclic amines; and perfluoroethers, including heterocyclic compounds. As an example of suitable alkane and cycloalkane derivatives, there may be mentioned: perfluorotributylamine, perfluoromethyldecalin, perfluorodecane, perfluorooctylbromide, perfluorodecalin, perfluorononane, perfluorooctane, perfluorobutyltetrahydrofuran, perfluoro-1,3-dimethylcyclohexane, perfluorohexane, perfluorodimethyladamantane, perfluoro-1,4-diisopropoxybutane, among others. It is an advantage that vapors of these compounds were found to be nontoxic in inhalation experiments with mammals up to concentrations high enough to reduce the oxygen content of the inspired air to a level where asphyxiation results (Fed. Proc. 29, 1699, 1970).

As an example of silicone which can be used in accordance with the present invention, there may be mentioned dimethyl polysiloxane marketed by DOW CORNING under the trade mark DC-200.

The pollutant particles which can be readily removed by the process of the present invention are those which have a diameter as low as a fraction of a micrometer or as high as to appear visible to the eye. These contaminants may be for example organic or inorganic fumes, dusts (in particular of insecticides or herbicides), suspended pigments, pollen, bacteria, viruses, radioactive fallout, etc., in general, all forms of particulates in an atmosphere, including solids, liquids or condensed gases, and all materials immediately dangerous to health.

It has also been found in accordance with the present invention that the important criteria of the liquid barrier film is that the film be continuous. For example it has been found that a liquid barrier film having a thickness of 1 mm will stop the particulate contaminants which come in contact with its surface at a high speed. It is difficult to determine, in theory or in practice, the impact of pollutant particles with a fluorocarbon or silicone liquid, their penetration into it, and their trajectories within it since no data on the fluid dynamics of these relatively new compounds are available and since, in general, the direct observation and measurement of these phenomena is hardly possible. It is also known that Newton predicted that the trajectory of a projectile is shorter than the long dimension of the projectile itself whenever the medium into which it penetrates has a higher density. The density of fluorocarbon liquids is between 1.6 and 1.8 g cm$^{-3}$, and all organic pollutants will cease to move within a distance less than their length. Also for example plutonium particles (density about 16 g cm$^{-3}$) and having a diameter of about 5 $\mu$m will be arrested in a fluorocarbon phase only 50 $\mu$m thick. Inversely, a liquid fluorocarbon film of about 1 mm in thickness will guarantee protection against any solid pollutant with a margin of security.

Contrary to the principle of operation of conventional filters, the liquid barrier filter of the present invention interrupts a gas stream completely and traps all particles polluting the gas, even those possessing a relatively high kinetic energy, with an ideal efficiency. At the same time, gas flow through the filter is maintained since the liquid permits gases to diffuse through it at a high rate. Liquid barrier filters will, therefore, be employed wherever an ultrapure atmosphere has to be guaranteed for prolonged periods. They should find particularly promising applications wherever the nature or concentration of particulate contaminants is immediately dangerous to life. With the exception of pure gases, all airborne contaminants fall into the category of particulate pollutants since they all form entities physically distinct from the carrier gas phase. They can be obnoxious or outright dangerous: liquid mists act, as do solids, as nuclei for the condensation, e.g., of radioactive gases at cooler altitudes. Masks containing a liquid barrier filter could be the most efficient means of protecting the bearer, for a design period, against the danger of inhaling highly toxic chemicals as, e.g., pesticide or herbicide dusts in manufacturing plants, and against radioactive particulate contaminants (fallout) after a catastrophic nuclear event. They offer an attractive alternative to carrying an air supply.

Therefore, the present invention also relates to an apparatus for removing pollutant particulates from a stream of contaminated gas which comprises: means forming a reservoir; a body of liquid in the reservoir, the liquid being selected from liquid fluorocarbons and liquid silicones; a filter matrix having a portion positioned below the surface of the body and being movable so as to form, outside the surface of the body, a continuous liquid film acting as a filter barrier to the stream of gas; inlet means located upstream of the film for admitting the contaminated gas to the liquid film whereby pollutant particulates carried by the admitted contaminated gas are absorbed by the liquid when contacting the liquid film while gas free of pollutant particulates is permitted to pass through the liquid film; and outlet means allowing passage of the gas free of the pollutant particulates.

Other objects and scope of applicability of the present invention will become apparent from the detailed description given hereinafter; it should be understood, however, that this description, while indicating preferred embodiments of the invention, is given by way of illustration only, since various changes and modifications within the spirit and scope of the invention will become apparent to those skilled in the art.

DESCRIPTION OF PREFERRED EMBODIMENTS

The embodiments discussed here are presented for purposes of illustration only and are not intended to be limiting in any manner.

Figure 1:
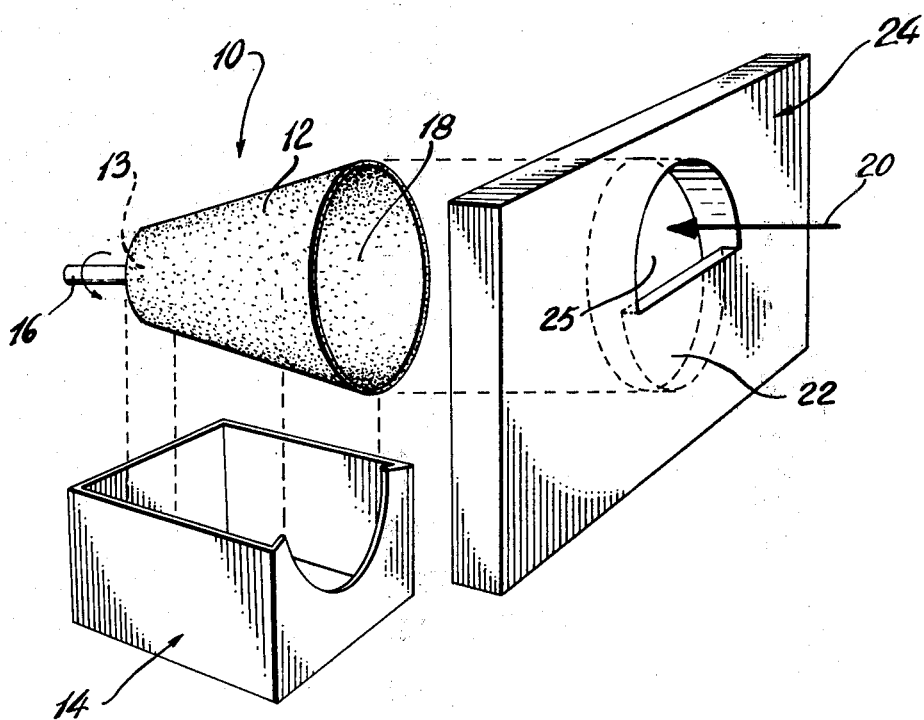
FIG. 1 is an exploded view showing the main components of a first embodiment of an apparatus made in accordance with the present invention.

Referring to FIG. 1, there is shown a filter matrix 10 as, for example, a glass-fiber filter such as Whatman type GF/B supported by a metal sieve having a mantle 12 and an end surface 13 defining a truncated cone. The matrix is set at an angle in a reservoir 14 in such a way that a slow rotation of the cone will bring every segment of the mantle surface into contact with the filtering liquid (not shown) once during each full rotation. An axle 16 may extend from the truncated end 13 of the cone to connect the cone to a small motor (not shown) so that it may be rotated at low speed. The filter has a base 18 opened to the stream of contaminated gas indicated by arrow 20; this base runs in a groove 22 provided in a face plate 24 which, in turn, has an inlet opening 25 to allow ingress of the gas stream to the filter matrix. In order to prevent leakage of the gas around the circumference at the junction between base and face plate, a fine brush (not shown) may line the groove and the filtering liquid drawn onto it.

Figure 2:
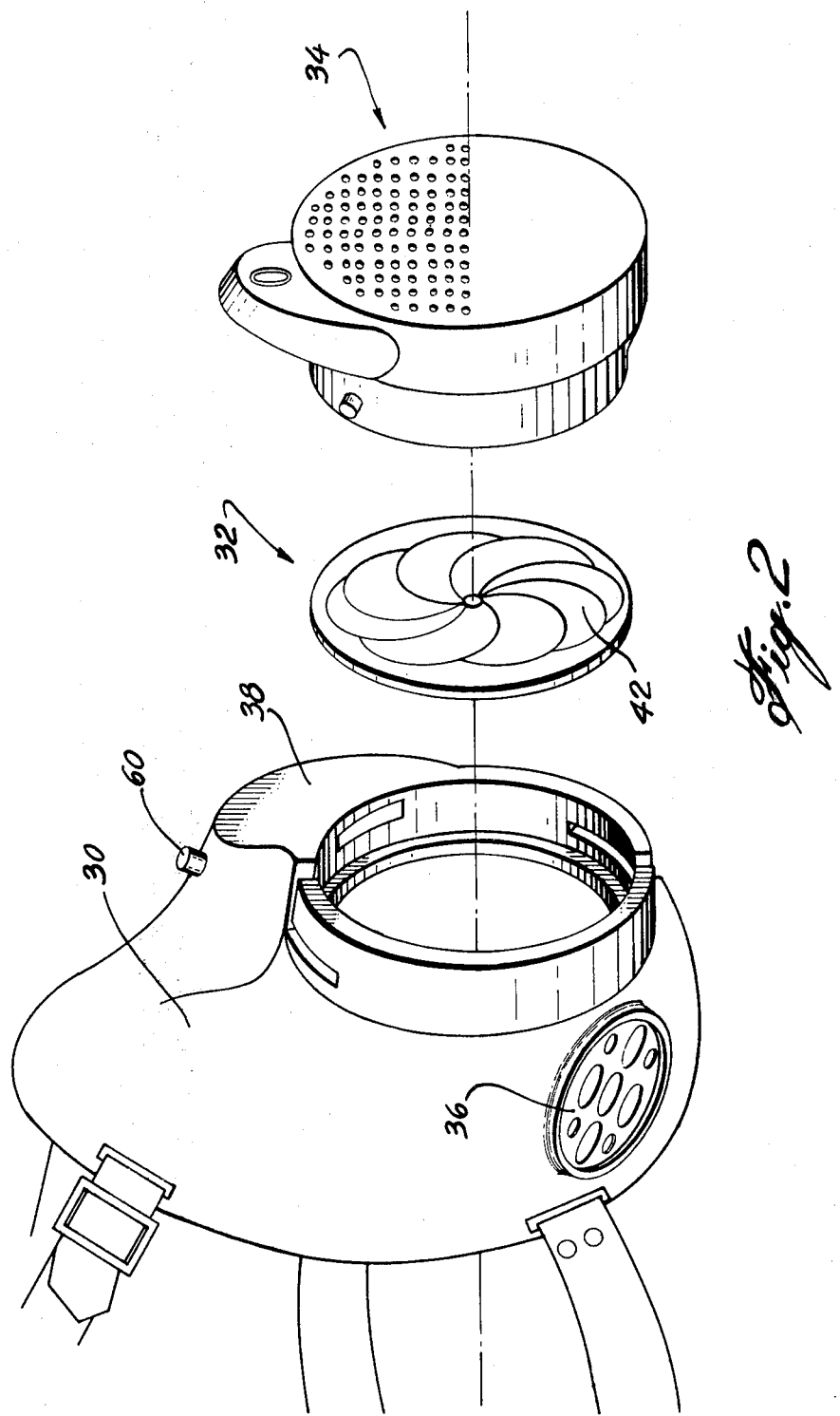
FIG. 2 is a perspective view of another embodiment of the present invention in the form of a mask.

Referring to FIG. 2, an apparatus made in accordance with the present invention is incorporated in a face mask which includes a molded rubber face piece 30 fitted with an inhalation valve 32 and a cartridge 34, the latter containing an apparatus made in accordance with the present invention.

Figure 3:
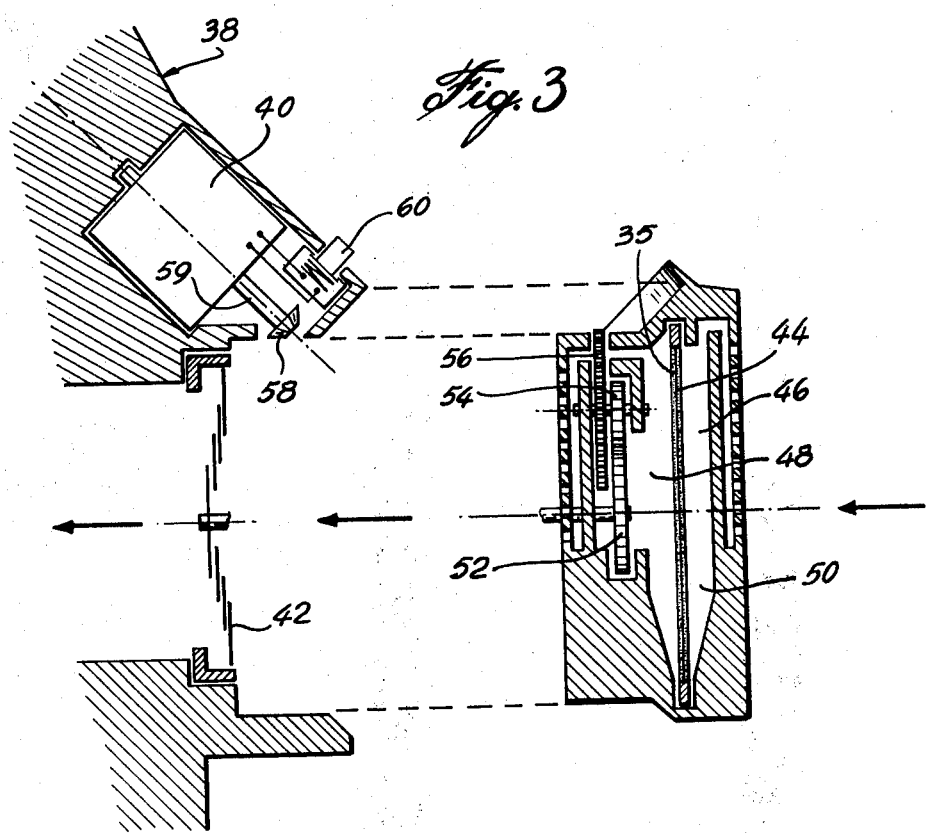
FIG. 3 is a cross-sectional view of the front portion of the mask.
Figure 4:
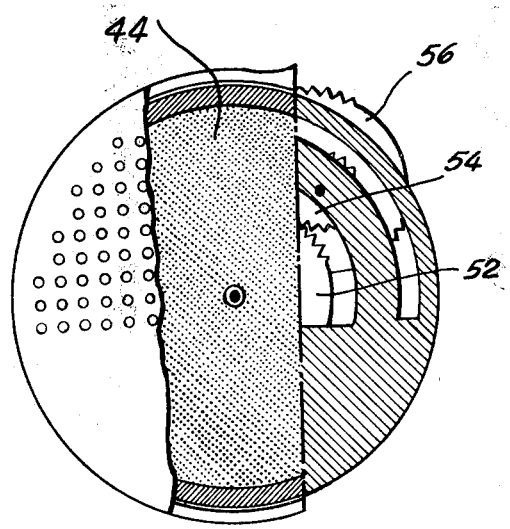
FIG. 4 is a front elevational view, partially broken away, showing the cartridge to be incorporated in the mask.

The apparatus of the invention is part of a respiratory assembly in the face mask. On both sides of the respirator assembly is provided a pair of exhalation valves, one of which is shown at 36. One side displays a protrusion 38 in which is mounted a small electric motor 40, as described hereinbelow with reference to FIG. 3.

The inhalation valve 32, of the same diameter as the cartridge 34, is permanently attached to the face piece 30. It is of the lamellar type and consists of a diaphragm assembled from a number of eccentric and overlapping light metal leaflets 42 that are displaced with respect to one another by a slight negative pressure, in the direction of the air current, to admit air in a unidirectional flow. Valves of this construction are well known and are used in medical instruments testing pulmonary functions. The two small exhalation valves 36 are of the single membrane type identical to those used in diving equipments; they provide a reliable seal so that, during inhalation, air is exclusively drawn through the cartridge 34.

The liquid barrier filter cartridge 34 consists of a glass fiber matrix 44 which is circular and supported on the downstream side by a fine meshed grid 35 of plastic or non-corroding metal. The filter turns on its axis on hubs (not shown) molded into the cartridge housing. Air is admitted through the top of the input chamber 46 and is withdrawn also from the top of the output chamber 48 in order to avoid that the filtering liquid which is to be received in the reservoir 50 of the cartridge may be spilled when a person wearing the mask bends down. A light-weight drive wheel 52 is turned by a set of coaxial horizontal gears 54 and 56 to rotate the filter matrix slowly through the liquid. The cartridge housing is left open above a small segment of gear 56.

Wheel 56 is engaged by the bevel gear 58 on the shaft 59 of the miniature motor 40 that is housed in the upper quadrant of the face piece. Since the motor has hardly any load to sustain, the smallest and most inexpensive one may be selected. Some miniature motors with a diameter and length of one inch run on a single 1.5 V cell and draw less than 50 mA. Only one speed is required and this is set by limiting the current flow rather than by further mechanical reduction. A switch 60 is used to actuate the motor. The protrusion in the upper quadrant of the cartridge houses a sealed container filled with the filtering liquid which is released on manual compression at an indicated point. It is directed through a nozzle to be absorbed into the circular filter. In one simple case, a glass ampoule can be crushed between two sharp ridges embedded in the housing. A plastic container could also be made to burst on compression or by penetration by a pin. Due to the ease with which the filtering liquid is absorbed into the filter matrix, the liquid level needs not reach the full diameter of the circular filter to keep it wetted. The volume of filtering liquid released depends on the period of operation for which the filter is designed. It is considered preferably to limit the volume of liquid for a period of operation of about 6 hours as the filter will, by then, have become partially charged, and to replace the cartridge at the end of this time. Other cartridges could be used in conjunction with the liquid barrier filter cartridge. They should be placed on the upstream side of the liquid barrier filter so as to act as roughing filters in addition to the normal design function.

The construction elements described above are only given for purpose of illustration and can be altered and adapted as it seems fit. For example, the filter matrix could take the form of a continuous belt placed upright and perpendicular to the gas stream; such belt would be laid over a pair of cylindrical rollers which would drive it through a reservoir containing the filtering liquid. In such embodiment, the returning sheet of the continuous belt could be considered as a second filter arranged in series with the one directly exposed to the air current. This would provide an additional safety factor against particulate pollutants of a very high kinetic energy even if the purified gas should be collected from the space between the sheets. Such design also would offer less mechanical resistance to the inlet gas pressure than the truncated cone or the mask.

EXAMPLE

The rotor of an IEC model HN centrifuge was replaced by a 1.0 cm (⅜ in.) thick circular plexiglas plate, 19 cm (7.5 in.) in diameter. A sturdy plastic container was attached to the inside wall of the centrifuge at the same elevation, facing the rotating plate at a distance of 1 cm (about 0.4 in.) from its perimeter. Its only open side was covered by a metal grid to which the filter matrix was clamped. A powder of spherical polysaccharide particles (Sephadex Density Marker Beads or Sephadex ® G-50, fine grade; Pharmacia Canada Ltd., Montreal), 20 to 80 microns in diameter, was applied in measured bursts from a hypodermic syringe onto the polished disc rotating at the desired speed, at a point 35° ahead of the filter box in the direction of rotation. Since mass, size, and density of these particles as well as the angular velocity of the centrifuge disc are known, the momentum of the polymer beads and their impact with the filter is controlled by varying the centrifuge's speed. The experimental apparatus was constructed in analogy to the Spinning Disc Generator designed by Whitby et al. (Technical Report No. 13, Mechanical Engineering Department, University of Minnesota, 1961), with the difference that these researchers generate wet dioctyl phthalate dispersions, better defined in size but requiring a very costly experimental set-up and much smaller. The experiments described here were intended to prove primarily that even particles contacting a liquid barrier filter (LBF) at a high momentum cannot penetrate the filter entirely.

The experimental conditions were chosen in a way to demonstrate unequivocally that a LBF performs extremely well, even under limiting conditions. For this reason, an 80-mesh nylon fabric (i.e., containing 80 open spaces per linear inch) with a thread thickness <0.05 mm (<1/500 in.) was used as the filter matrix into which the fluorocarbon liquid was to be absorbed. Three layers of this fabric were superposed and separated from a transparent backing coated with a non-drying adhesive by a 0.8 mm (31/1000 in.) thick Teflon ® spacer. This assembly was attached to the filter box and perfluorotetrahydrofuran (FC-47 ®, 3M Company, St. Paul, Minn.) liquid was absorbed into it directly before an experiment. The highly surface-active fluorocarbon is held by capillary action in the widemesh fabric. Sephadex ® particles were deposited on the rotor plate as soon as the centrifuge had attained speeds between 600 and 1800 rpm giving tangential escape velocities of 95 to 285 cm/sec (i.e., 188 to 563 ft/min). The run was then repeated with the same filter matrix not containing fluorocarbon. In these control experiments, the nylon fabric's wide mesh had virtually no sieving effect: all Sephadex ® particles penetrated the fabric readily to adhere to the backing. The particles deposited in designated areas on the transparent backing were counted without further manipulation under a microscope at low magnification. Both Sephadex ® types used were clearly visible and distinguished as the Density Marker Beads are colorcoded for density. The following table presents the results of a total number of 36 experiments, 6 for each time given. Charging time refers to the period during which the filters were dusted with bursts of the polysaccharide powder in 30 sec intervals. Because of their high cost, the density-calibrated beads were only added in the 2 mid-time and the last 2 applications of an experiment with the filter otherwise exposed to Sephadex ® G-50 powder. A direct measure of the filter's efficiency is the number of particles that have penetrated a unit filter area and have come to adhere to the backing, compared with that in a control experiment. Their ratio is given as % efficiency. We note that the LBF captures all material and retains it even after prolonged periods of charging. In 5 of the 36 cases (at the charging times marked by an asterisk), the wet filter inadvertently touched the adhesive backing during post-experimental handling and a number of particles were thus transferred in the area of contact; no particles were found outside this defined area. These contaminations account for the efficiencies of less than 100%.

| Charging time [min] | No. of particles deposited per unit area across matrix only (control) | No. of particles deposited per unit area across LBF (liquid barrier filter) | % efficiency |
| --- | --- | --- | --- |
| 5 | 101 ± 29 | 0 | 100 |
| 10 | 369 ± 68 | 0 | 100 |
| 20 | 581 ± 42 | 0 | 100 |
| 25 | 603 ± 74 | 0.9 | 100 |

In conclusion: neither the particle momentum varying, with the range of speeds and the range of sizes, by a factor of 12 nor the charging times of up to 30 min diminish the LBF's efficiency. It is evident that washing the contaminants off the filter and replenishing or replacing the filtering liquid periodically will prolong the useful life of a LBF while it continues to operate at ideal efficiency. The filter designs given below provide for the removal of contaminants and the replenishment of the filtering liquid by the continuous rotation of the filter matrix through a fluorocarbon bath.

The design of a functional filter system has to provide for replacement of the small quantities of liquid lost by evaporation. This requirement turns into an advantage: the slow rotation of the filter matrix through a liquid reservoir not only replenishes the liquid but also washes off particulates that have accumulated on the filter. We then have a system that continuously renews itself thus preventing clogging and increased flow resistance. This constitutes a true advantage over conventional filters that have to be exchanged and cleaned and which sometimes require treatment to assure that particles stick to the matrix after initial contact.

We claim:

1. Process for removing pollutant particulates from a contaminated gas which comprises:
   (a) passing a stream of gas containing pollutant particulates through a continuous liquid film absorbed on a continuously circulating filter supported by a perforated carrier matrix wherein part of said filter is continuously passing through a liquid reservoir containing said filtering liquid selected from liquid fluorocarbons and liquid silicones whereby the contaminant particulates carried by said gas are absorbed by said liquid film acting as a filter barrier for said particulates, and
   (b) recovering the gas after its passage through said continuous liquid film barrier filter, said gas being free of said particulates.

2. Process for removing pollutant particulates from a contaminated gas which comprises:
   (a) passing a stream of gas containing pollutant particulates through a continuous liquid film selected from a liquid fluorocarbon and a liquid silicone, said film being supported by a carrier filter matrix part of which is continuously circulating through a reservoir containing the filtering liquid, whereby the particulates carried by said gas are absorbed by said liquid film acting as a filter barrier at the interstices of the filter matrix, and
   (b) recovering the gas free from solid particulates after its passage through said continuous liquid film and filter matrix.

3. A apparatus for removing pollutant particulates from a stream of contaminated gas comprising:
   means forming a reservoir;
   a body of liquid in said reservoir, said liquid being selected from liquid fluorocarbons and liquid silicones;
   a filter matrix having a portion positioned below the surface of said body means for moving said filter matrix to form, outside said surface of said body, a continuous liquid film acting as a filter barrier to said stream of contaminated gas;
   inlet means located upstream of said continuous liquid film for admitting and directing said contaminated gas to said liquid film whereby pollutant particulates carried by the admitted contaminated gas are absorbed by said liquid when contacting said liquid film, while gas free of pollutant particulates is permitted to pass through said continuous liquid film;
   outlet means allowing passage of said gas free of said pollutant particulates.

4. An apparatus as defined in claim 3, wherein said filter matrix is in the shape of a truncated cone having a mantle portion positioned below said surface of said body of liquid and an opened base opened to said stream of said gas.

5. A face mask having incorporated therein an apparatus for removing pollutant particulates from a stream of contaminated gas comprising:
   means forming a reservoir;
   a body of liquid in said reservoir, said liquid being selected from liquid fluorocarbons and liquid silicones;
   a circular filter matrix having a portion positioned below the surface of said body, means for moving said filter matrix to form, outside said surface of said body, a continuous liquid film acting as a filter barrier to said stream of contaminated gas;
   inlet means located upstream of said continuous liquid film for admitting and directing said contaminated gas to said liquid film whereby pollutant particulates carried by the admitted contaminated gas are absorbed by said liquid when contacting said liquid film, while gas free of pollutant particulates is permitted to pass through said liquid film;
   outlet means allowing passage of said gas free of said pollutant particulates.

6. A face mask as defined in claim 5, wherein said moving means comprise motor means in said face mask for rotating said filter matrix and gear means between said motor means and said filter matrix for transmitting drive therebetween.

* * * * *